July 7, 1959        J. J. SHADA        2,893,688

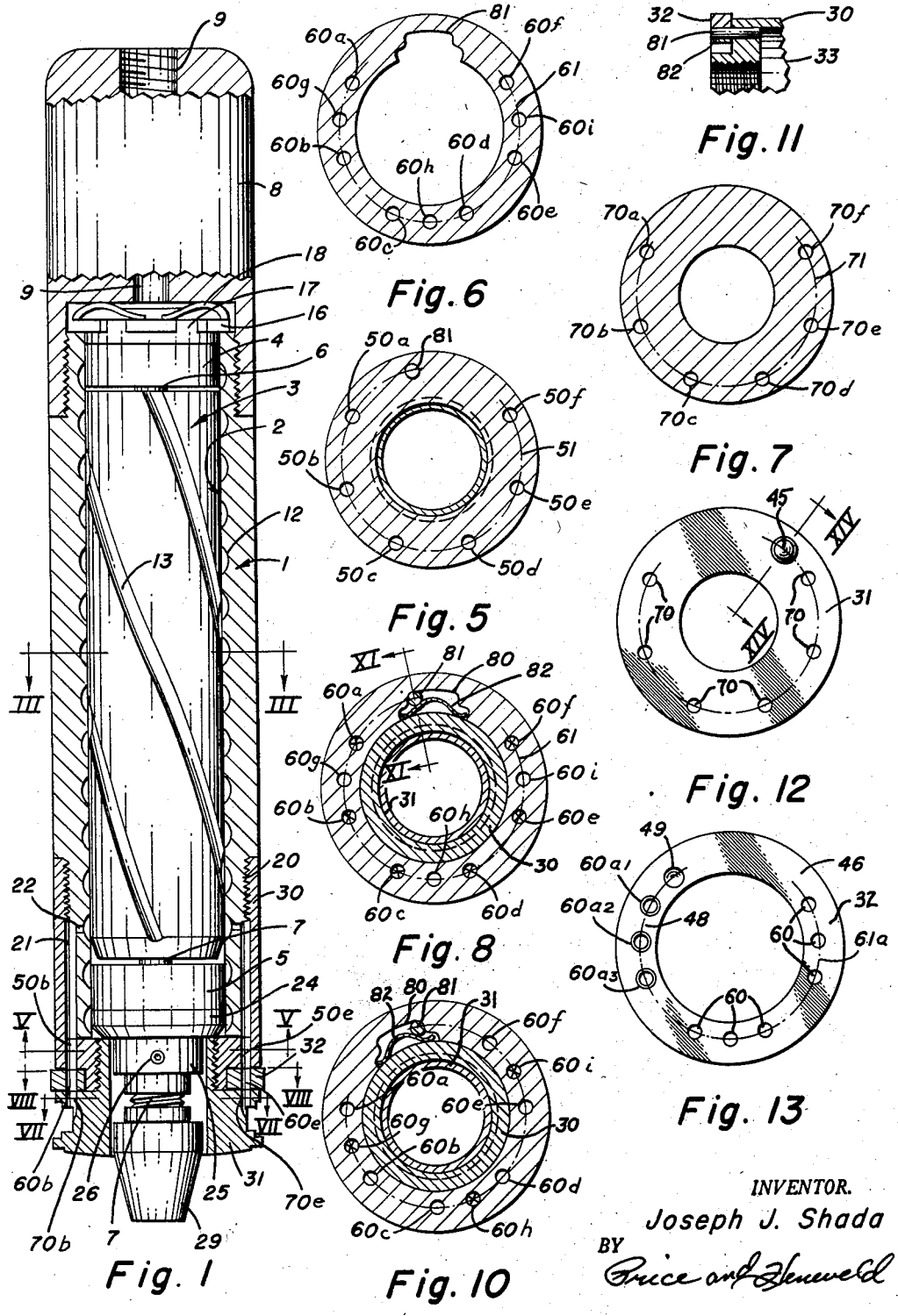

FLUID POWER MOTOR VALVE

Filed July 2, 1956        2 Sheets-Sheet 2

INVENTOR.
Joseph J. Shada
BY
ATTORNEYS

United States Patent Office 2,893,688
Patented July 7, 1959

2,893,688

FLUID POWER MOTOR VALVE

Joseph J. Shada, Grand Rapids, Mich., assignor, by mesne assignments, to Bellows Electric Sign Corporation, Akron, Ohio, a corporation of Ohio Application July 2, 1956, Serial No. 595,182

5 Claims. (Cl. 253—3)

This invention relates to prime movers actuated by compressed air and more particularly to compressed air motors or other type motors operated by rapidly moving fluids such as steam under compression.

In fluid actuated prime movers of the type in question the fluids released into the motor impel the prime mover elements at a high speed of actuation and with considerable power. This application relates to such type motors having a novel means for regulating its speed without affecting its power.

This invention is more particularly concerned with an improved motor of the type disclosed in co-pending application entitled "Compressed Air Motor," Serial No. 460,736, filed October 6, 1954, now Patent No. 2,808,225.

The primary object of this invention is to provide a means for controlling the speed of the compressed air motor without adversely affecting its power output.

A more specific object of this invention is to provide a small pencil-type motor useful for propelling at high speeds and with considerable power small grinding stones or abrasive points mounted in the shaft of the motor. This invention is designed to vary the speed of the shaft without affecting the available power.

As a result of the above objects, this invention embodies various new and useful features of construction and arrangement, as hereinafter more fully described and particularly pointed out in the claims.

All the objects of this invention will become more obvious upon reading the following specification in conjunction with the accompanying drawings wherein:

Fig. 1 is a central sectional view of the motor.

Fig. 5 is a sectional, elevational view taken along the plane V—V of Fig. 1.

Fig. 6 is a sectional, elevational view taken along the plane VI—VI of Fig. 4.

Fig. 7 is a sectional, elevational view taken along the plane VII—VII of Fig. 1.

Fig. 8 is a sectional, elevational view taken along the plane VIII—VIII of Fig. 1.

Fig. 10 is a sectional, elevational view taken along the plane X—X of Fig. 9.

Fig. 11 is a partial, cross-sectional, elevational view taken along the plane XI—XI of Fig. 8, such view in addition showing the cap in which the locating pin is mounted.

Fig. 12 is a plan view of a modified attachment head for locking the valve plate in one of several positions.

Fig. 13 is a plan view of a modified valve plate for use with the attachment head of Fig. 12.

Figure 4:
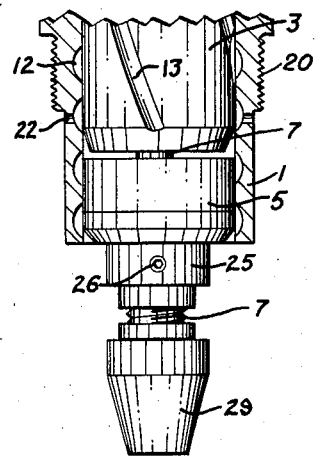
Fig. 4 is an exploded view of the head of the motor in which the novel features of this invention are contained.

Briefly this invention is concerned with a prime mover actuated by compressed air. The novel feature of this prime mover is the means for regulating its speed. In the preferred form of this invention the prime mover is a compressed air motor including a stator and a rotor. At the front of the motor are a plurality of exhaust ports that exhaust the air passing through and actuating the motor.

In accordance with this invention a valve having a plurality of ports corresponding to that of the front of the motor is provided. This valve is adjustable on the motor for opening and closing predetermined ports depending upon its position. The number of open ports determines the speed of the motor.

In the preferred form of this invention the motor has a cap with a plurality of ports arranged circumferentially on its face. A plate is rotatably mounted on the face of the cap and has a plurality of ports which are adapted to be aligned or misaligned with the ports of the cap. The number of aligned ports of the cap and plate determines the speed of the motor.

In the following description terms "front" and "rear" are frequently used and are to be taken to mean: "front"—toward the chuck end of the motor, and "rear"—toward the air intake port.

Referring specifically to the drawings reference numeral 1 denotes the stator or shell 1 having a cylindrical outer shape and a central bore 2 open at both ends which ends are closed in the assembly as hereinafter described. Rotatably mounted in the central bore 2 is a cylindrical rotor 3. The rotor 3 is rotatably mounted at each end on the roller bearings 4 and 5. The bearings are located around the stud shaft 6 and the drive shaft 7 of the rotor and inserted into the respective ends of the bore 2. The shafts 6 and 7 while described as two separate short components may be the opposite ends of a single shaft extending through the body of the rotor 3 or they may be integral with the rotor body. The rotor fits very closely within the bore. The clearance in the smaller sizes being on the order of .001 inch.

The walls of the bore 2 of the shell 1 are provided with helical grooves 12 extending a substantial portion of the length of the housing. In the illustration the helical grooves 12 are four in number and extend the entire length of the housing. Helical grooves 12 serve as air channels by means of which the air may travel through the tool from the valve intake to the discharge end adjacent the tool chuck.

Figure 3:
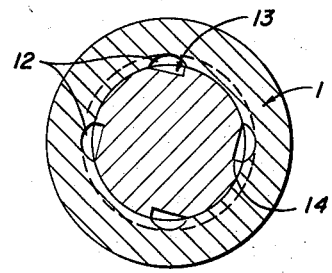
Fig. 3 is a sectional, elevational view taken along the plane III—III of Fig. 1.

The rotor 3 has a plurality of helical grooves 13 cut into its face. The grooves 13 have one face inclined to the surface of the rotor and another face substantially normal to the surface of the rotor to form a shoulder 14. (Fig. 3.) The shoulder 14 forms a baffle against which the air passing through the motor operates to drive the motor. Thus, this shoulder is on the side of the groove in the direction of rotation of the rotor.

Figure 2:
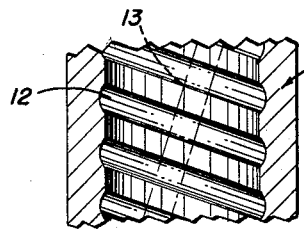
Fig. 2 is a fragmentary, central sectional view of the housing showing the air channel grooving therein.

Grooves 12 and 13 are so related to each other that they intersect at a right angle (Fig. 2). This right angle intersection causes the air to impinge directly against the shoulder 14, thus imparting both speed and torque to the rotor. The significance of this arrangement is discussed in detail in co-pending application Serial No. 460,736 filed October 6, 1954.

The inlet end of the shell 1 is closed by a screw threaded cap 8 having an opening 9 threaded at one end. This threaded end is adapted to receive a fitting for a hose or other conduit through which the compressed air or other power medium is introduced into the motor.

Between the cap 8 and the bearing 4 is a short space in which is located the retainer cap 16 and spring 18. The retainer cap 16 has a portion of reduced diameter designed to enter the bore 2 and seat against the rear surface of the bearing 4. It has a flange on its rearward portion, such flange being designed to extend out over the end of the shell 1. This flange has a plurality of peripheral notches 17 equal in number to the number of grooves 12 in the wall of the bore 2. These notches are aligned with the grooves 12 of the stator 2 and provide the openings by which air enters the grooves 12 and is permitted to pass the entire length of the shell. The spring 18 located rearwardly of retainer 16 bears against the retainer and the cap 8. The center of the spring is apertured to permit passage of the air from the cap 8 to the interior of the motor. This entire structure is shown and described in more detail in co-pending application Serial No. 460,736 filed October 6, 1954.

The novel feature of this invention exists at the forward end of the motor. In conventional motors of this type, such as that disclosed in co-pending application Serial No. 460,736, a valve is located at the rearward end of the motor for regulating the amount of air passing through the motor. This controls the speed of the motor. In this invention a novel valve is provided at the front end to regulate the motor's speed.

At the forward end of the motor, bearing 5 is press fitted into the end of the shell 1. A front retainer 24 is inserted in front of the bearing 5 to retain it in the bore 2. The front retainer 24 has the shape of the washer but its sides are slightly coned as indicated. In front of the retainer 24 is the wrench nut 25 which is secured directly to the shaft 7 by a pair of diametrically positioned set screws 26, only one of which is shown. The wrench nut 25 has a pair of diametrically spaced notches (not illustrated) which serve as a seat for the wrench used to hold the drive shaft 7. The forward end of the shaft 7 is threaded. It receives the tool chuck 29 which is adapted to receive a shaft to which is secured the working element such as a grinding or drilling element.

The mechanism at the front of the motor is enclosed in a head assembly which includes the cap 30, the head element 31, and the adjustable valve plate 32.

The cap 30 is a cylindrical tubular member having a rear portion internally threaded at 33 for receiving the threaded portion 20 of the shell 1. The cap 30 extends forwardly beyond the end of the shell 1.

A substantial portion of the wall of cap 30 is spaced from a portion of the exterior wall of shell 1. This forms an annular passage 21 which communicates with grooves 12 by several holes 22 extending through the wall of shell 1.

At its front end the inner and outer diameters of the cap 30 are reduced forming a neck 35 internally threaded at 37. The juncture at the neck and main body forms the shoulder 34. Extending through the wall of the shoulder 34 are the exhaust ports 50 which also communicate with passage 21. The arrangement of these ports 50 will be described hereinafter.

The adjustable valve plate or ring 32 has a larger outer diameter than the outer diameter of the cap 30. Its outer diameter is preferably knurled providing a rough surface. The adjustable valve plate 32 has a central aperture 36 of substantially the same diameter as the neck 35. This permits the plate 32 to seat over the neck on the shoulders 34. The thickness of plate 32 is equal to the length of the neck 35 so that when assembled the front edge of neck 35 is flush with the front surface of the plate 32. Plate 32 has a plurality of ports 60 located on the same circumference as the ports 50 as will be explained hereafter.

The head 31 consists of a cylindrical member having a central bore 38 for receiving the chuck 29. Its rear portion has a reduced diameter forming a neck 39 which is threaded. The threaded neck 39 is of the proper size to be received by the threaded aperture 37 of the cap 30. The front end 40 of head 31 has an annular groove 41 providing spaced annular flanges 42 and 43. The flanges 42 bear against the front faces of the plate 32. Flanges 42 have a plurality of ports 70 arranged to be aligned with the ports 50 of cap 30.

The above described structure permits air being discharged from the bore 2 to flow through holes 22, annular passageway 21, and ports 50, 60, and 70. Since there is a very small clearance between the interior of the head assembly and the retainer 24 and wrench nut 25, a small portion of the air flows between these elements and exits through the central bore 38 of the head element 31, passing around the tool chuck 29. This air which is a small amount of the total serves as a means for clearing the chips from the immediate vicinity of the tool. Irrespective of this small flow of air, this invention relates particularly to the valve means for regulating the amount of air passing through the exhaust ports 50, 60, and 70.

Fig. 5 shows the arrangement of the ports 50 of the cap 30. These ports are designated 50a, 50b, 50c, 50d, 50e, and 50f in order to facilitate describing the operation of the device. These ports 50 are six in number and equally spaced along the circumference 51.

Fig. 7 shows the ports 70 of the head 31. These ports are designated 70a, 70b, 70c, 70d, 70e, and 70f. When the motor is assembled the ports 70 are located in substantially the same relative position as the ports 50. Their centers lie on circumference 71 which is of the same radius as circumference 51. Thus, when assembled the ports 50 and 70 are aligned.

Fig. 6 shows the location of the ports 60 of the valve plate 32. These ports designated as 60a, 60b, 60c, 60d, 60e, 60f, 60g, 60h, and 60i, are all located on the circumference 61 which is of equal diameter to that of circumferences 51 and 71. The ports 60 are greater in number than the ports 50 and 70. Ports 60a, 60b, 60c, 60d, 60e and 60f, in one position, are located in the same relative angular positions as corresponding ports 50 and 70. The additional ports 60g, 60h and 60i in that one position are misaligned with ports 50 and 70 but in a second position are aligned with certain of the ports 50 and 70. Thus, the purpose of the valve plate 32 is to open a certain number of ports in one position and a different number in another position.

One of these positions of the valve plate 32 is illustrated in Figs. 1 and 8. In this one position ports 60a, 60b, 60c, 60d, 60e, and 60f are aligned with corresponding ports 50 and 70. Therefore, six ports are opened for exhausting the air from the motor. This is illustrated in Fig. 8 in which the ports with X's denote open ports through which air passes and those without X's designate closed ports.

Figure 9:
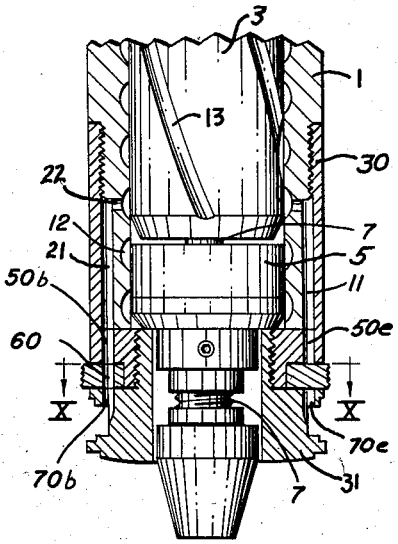
Fig. 9 is a partial, assembled view of the head of the motor with the valve means in a different position than that of Fig. 1.

In the second position of Figs. 9 and 10 the valve plate has been rotated counterclockwise from its position in Fig. 8. In this position port 60g is aligned with ports 50b and 70b, port 60h is aligned with ports 50d and 70d, and port 60i is aligned with port 50f and 70f. These open ports are designated by the X's whereas the closed ports do not have X's.

Thus, in the second position of Fig. 8 three ports are opened and three are closed. As a result less air can be exhausted and less air passes through the motor reducing its speed of rotation.

It should be realized that any number of combinations of ports 50, 60 and 70 can be devised to regulate the quantity of air exhausted from the motor. For example, one of the ports 60g, 60h or 60i could be eliminated, in which case only two ports would be open for exhausting the air. Likewise, several more ports could be added to each of the components to obtain a greater number of exhaust ports in the second position.

Figs. 8, 9 and 10 illustrate a retaining means for locking the valve plate in one of the two positions. For this purpose, I provide an annular elongated slot 80 in the valve plate. Slot 80 has a shorter outer portion than inner portion. It is located in a proper position to receive in the outer portion a pin 81 extending from the cap 30. A leaf spring 82 is fitted into the inner portion of the slot. The spring is arcuate in shape and extends in the outer portion of the slot where it contacts the pin 82. The pin 82 rides in the outer portion of slot 80 from one end to the other and in so doing rides over the hump of the arcuate spring. The spring thus biases pin 80 in either direction depending upon what side of the hump the pin is located. Thus the pin in one position (shown in Fig. 8) locks the plate 32 in clockwise position. In the other position (shown in Fig. 10), the pin locks the plate in counter-clockwise position.

*Assembly*

The motor is assembled by inserting the rotor 3 in the bore 2. The bearings 4 and 5 are then press fitted into place. The press fit must be light to avoid all possibility of warpage, compression or other deformation of the bearing races. With the rotor and bearings in place, the rear retainer pin 16 is inserted. Then the spring 18 is seated on top of the retaining cap. In seating the cap, care is taken to align the notches 17 with the grooves 12 in the wall of the bore 2. This is essential to assure adequate flow of air into the bore 2 to operate the rotor 3. The rear cap 8 is then screwed in place.

At the front end, the front retainer 24 is located and the wrenching nut 25 secured by means of the set screws 26. The wrenching nut serves as a means of gripping the shaft when tools are changed. The chuck is then threaded onto the end of the drive shaft 7. With this assembly complete, the head assembly including the cap 30, valve plate 32, and head 31 is placed over the entire assembly, encasing the front assembly. In this position the chuck 29 is confined substantially in the head assembly with a short portion of it projecting outwardly.

In assembling the head assembly before inserting it on the motor, the plate 32 is placed over neck 35 in the position so that slot 80 receives pin 81. The spring 82 is then inserted. If desirable, it can be fitted in slot 80 or on shoulder 34 previous to placing of the valve plate 32. Having placed plate 32, the head element 31 is screwed into the threaded bore 37. The head 31 is tightened to the proper position where ports 70 are aligned with ports 50. The position of the pin 81 in relation to slot 80 determines the exact positions of the ports 60 in relation to the ports 50. Therefore, the alignment of the ports 60 with the ports 50 is automatic. However, care is taken to align all the ports 70 with ports 50.

*Operation*

In the operation of this motor, air is injected through opening 9 and it flows through the notches 17 into the helical grooves 12. In flowing through the helical grooves 12 the air strikes the baffles 14 of the grooves 13 causing the rotor to rotate at extremely high speeds. The air flows through the motor and exits through the passages 22 in the stator 1. The air then passes through the passage 21 and into the ports 50 of the cap 30.

In the one position of Figs. 1 and 8 the air passes through ports 60a, 60b, 60c, 60d, 60e, and 60f and through the ports 70a, 70b, 70c, 70d, 70e and 70f. Thus, the air is exhausted from all six of the ports.

In the second position of Figs. 9 and 10 the communication between ports 50a and 70a, 50c and 70c, and 50e and 70e is closed. The ports 60g, 60h and 60i permit the exhaust of air through ports 50b and 70b, 50d and 70d, and 50f and 70f. Thus, in the second position the air is exhausted through three ports. Thus the air exhausted is one-half the quantity obtained by the position of Figs. 1 and 8.

Controlling the exhaust of air controls the amount of air passing through the motor and thus the speed of the motor. Controlling the exhaust has the marked advantage of controlling speed without losing power. The power of any air motor is directly proportional to the pressure at the inlet end. Therefore, if the speed of the motor is regulated by cutting down the air entering the motor, which can only be done by a resultant decrease in pressure, the force on the rotor is likewise decreased. As a result the torque and the power which the motor is capable of producing is markedly decreased. In accordance with this invention I regulate the amount of exhaust from the motor. Accordingly, the pressure at the inlet end never decreases and the available power and torque that the motor can produce is not affected.

This invention makes tools of the type previously described more versatile because they can be made into variable speed motors without affecting the power which the motor is capable of delivering. This is particularly important in grinders, screw drivers, and impact wrenches where the power requirement is important. My motor is particularly adapted for grinders. The different size tips on the pencil type grinders, for example, require different r.p.m. for safety reasons. The use of large tips with extremely high r.p.m. result in the distintegration of the grinder tips due to the centrifugal force caused by the extremely high speeds. Thus, the larger tips require smaller speeds but at the same time require considerable power. This invention serves this purpose.

*Modifications*

Figure 14:
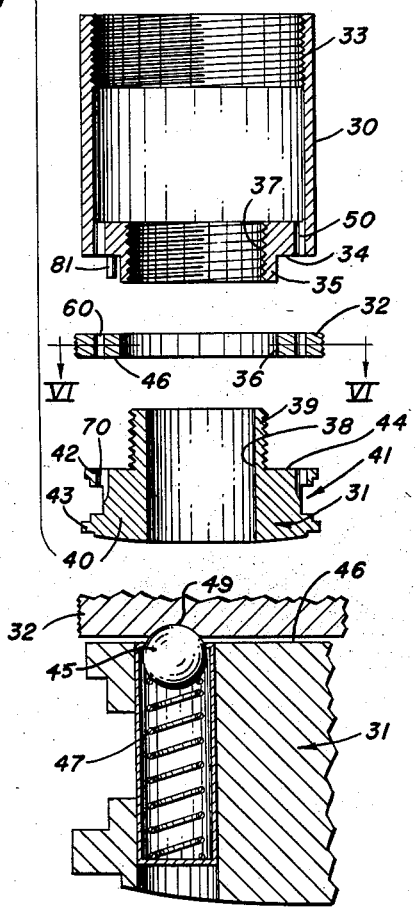
Fig. 14 is a partial, cross-sectional view taken along the plane XIV—XIV of Fig. 12, such view in addition showing the valve plate in place.

Figs. 12, 13 and 14 show a modification of the retaining means for locking the valve plate in certain positions. In this particular modification, the shoulder 44 of head element 31 has a spring biased ball detent 45 biased outwardly against the front face 46 of the plate 32 by spring 47. In this particular modification the ports 60 serve as the recess means for receiving the ball detent 45. Thus, the ball detent rides along the circumference 61a (Fig. 13) in groove 48 and from position to position is received first by recess 49, secondly port $60a_1$, then by port $60a_2$, etc.

The ports 60 are arranged in relation to the ports 50 and 70 so that in the first position six ports are open. In the second position three ports are open. In the third position five ports are open, and in the fourth position two ports are open. It should be understood that the number of open ports depends upon the location of each of the ports 60, 70, and 50 in relation to each other. Any number of arrangements can be made to give the desired number of open exhaust ports.

It should be evident that this modification, in which the detent 90 is utilized, makes a greater number of positions possible. This is accomplished with very little modification of the basic concept. The ports 60 which also serve as the detent receiving means makes this modification very acceptable.

It should be understood that I have disclosed preferred embodiments and modifications of this invention. Other modifications and embodiments are possible within the broadest aspect of this invention. Therefore, these modifications and embodiments are considered to be covered by this invention except that the appended claims expressly state otherwise.

I claim:

1. An air prime mover including a stator and a rotor, air inlet means for permitting air to actuate said rotor, and air exhaust means for exhausting said air, the improvement comprising: said stator having a cylindrical cap at its forward end; said cap having a plurality of circumferential spaced ports in its face, said ports providing said exhaust means; and a plate rotatably mounted on the face of said cap; said plate having a plurality of ports arranged to align with predetermined ports of said cap depending upon the angular position of said plate whereby the exhaustion of air from said cap can be controlled to regulate the rotor speed; a locating pin extending from said face; an annular slot in said plate receiving said pin; and spring means for retaining said pin in one position in said slot.

2. An air prime mover including a stator and a rotor, air inlet means for permitting air to actuate said rotor, and air exhaust means for exhausting said air, the improvement comprising: said stator having a cylindrical cap at its forward end; said cap having a plurality of circumferential spaced ports in its face, said ports providing said exhaust means; and a plate rotatably mounted on the face of said cap; said plate having a plurality of ports arranged to align with predetermined ports of said cap depending upon the angular position of said plate whereby the exhaustion of air from said cap can be controlled to regulate the rotor speed; a locating pin extending from said face; an annular slot in said plate; said slot being wider than said pin; and an arcuate elongated spring extending along said slot and bearing against said pin for holding said pin in one position.

3. An air prime mover including a stator and a rotor, air inlet means for permitting air to actuate said rotor, and air exhaust means for exhausting said air, the improvement comprising: said stator having a cylindrical cap at its forward end; said cap having a plurality of circumferential spaced ports in its face, said ports providing said exhaust means; and a plate rotatably mounted on the face of said cap; said plate having a plurality of ports arranged to align with predetermined ports of said cap depending upon the angular position of said plate whereby the exhaustion of air from said cap can be controlled to regulate the rotor speed; and ball detent means operatively associated with said ports in said plate for retaining said plate in one of several positions.

4. An air motor comprising an elongated cylindrical stator having a continuous helical groove; an elongated cylindrical rotor having grooves arranged at an angle to said helical grooves; air inlet means at one end of said stator adapted to continuously feed air to and through said helical groove to pass said air from said one end of the other; an exhaust means at the other end of said stator for exhausting the air passing through said helical groove; and a valve operatively associated with said exhaust means for regulating the rate said air is exhausted in order to control the speed of said rotor.

5. An air motor comprising an elongated cylindrical stator having a continuous helical groove; an elongated cylindrical rotor having grooves arranged at an angle to said helical groove; air inlet means at one end of said stator adapted to continuously feed air to and through said helical groove to pass said air from said one end to the other; the improvement comprising; said stator having a cap at its forward end with a plurality of ports therein; said ports providing said air exhaust means; and valve means rotatable with respect to said cap and having ports adapted to be aligned and misaligned with predetermined ports of said cap depending upon the position of said valve means whereby the exhaustion of said air can be controlled to regulate the rotor speed.

References Cited in the file of this patent

UNITED STATES PATENTS

| | | |
|---|---|---|
| 793,204 | Lemke | June 27, 1905 |
| 807,452 | Franke | Dec. 19, 1905 |
| 1,008,781 | Born | Nov. 14, 1911 |
| 1,114,713 | Dickinson | Oct. 20, 1914 |
| 1,240,743 | Loewenstein | Sept. 18, 1917 |
| 1,624,529 | Buffington et al. | Apr. 12, 1927 |
| 1,856,631 | Hackenberg | May 3, 1932 |
| 1,864,019 | Hoffman | June 21, 1932 |
| 1,864,027 | Pederson | June 21, 1932 |
| 1,899,142 | Erickson | Feb. 28, 1933 |
| 2,543,134 | Smith | Feb. 27, 1951 |
| 2,588,311 | Wagner | Mar. 4, 1952 |

FOREIGN PATENTS

| | | |
|---|---|---|
| 547,777 | Great Britain | Sept. 10, 1942 |